United States Patent
Burr

(10) Patent No.: US 10,375,975 B1
(45) Date of Patent: *Aug. 13, 2019

(54) SYSTEM AND METHOD FOR PRODUCING PELLETED ANIMAL FEED BLOCKS

(71) Applicant: PURINA ANIMAL NUTRITION LLC, Shoeview, MN (US)

(72) Inventor: Michael S. Burr, Marthasville, MO (US)

(73) Assignee: Purina Animal Nutrition LLC, Shoreview, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,601

(22) Filed: Apr. 9, 2018

Related U.S. Application Data

(63) Continuation of application No. 14/057,914, filed on Oct. 18, 2013, now Pat. No. 9,968,114.

(51) Int. Cl.
| | |
|---|---|
| *A23K 40/20* | (2016.01) |
| *B30B 11/00* | (2006.01) |
| *A23K 50/75* | (2016.01) |
| *A23K 50/20* | (2016.01) |
| *A23K 50/30* | (2016.01) |
| *A23K 50/50* | (2016.01) |
| *A23K 40/25* | (2016.01) |
| *A23K 50/60* | (2016.01) |

(Continued)

(52) U.S. Cl.
CPC .............. *A23K 40/20* (2016.05); *A23K 40/25* (2016.05); *A23K 50/10* (2016.05); *A23K 50/20* (2016.05); *A23K 50/30* (2016.05); *A23K 50/50* (2016.05); *A23K 50/60* (2016.05); *A23K 50/70* (2016.05); *A23K 50/75* (2016.05); *B30B 11/00* (2013.01)

(58) Field of Classification Search
CPC ........ A23K 40/10; A23K 40/20; A23K 50/10; A23K 50/15
See application file for complete search history.

(56) References Cited

U.S. PATENT DOCUMENTS

| | | | |
|---|---|---|---|
| 3,881,024 A | * | 4/1975 | Pahoundis ............ A23K 40/20 426/272 |
| 6,168,803 B1 | | 1/2001 | Harris et al. |
| 7,390,520 B2 | | 6/2008 | Dempsey et al. |

(Continued)

FOREIGN PATENT DOCUMENTS

| | | |
|---|---|---|
| EP | 0680820 A1 | 11/1995 |
| EP | 1404186 B1 | 1/2011 |

(Continued)

*Primary Examiner* — Walter A Moore
(74) *Attorney, Agent, or Firm* — Dorsey & Whitney LLP

(57) ABSTRACT

Animal feed blocks composed of feed pellets are formed by conditioning a meal of a particulated animal feed mixture through heating the meal using steam to cause at least one of the feed components in the feed mixture to bind the meal. The heated meal is mechanically forced through a die to compress the meal into heated pellets. The heated pellets are collected in a pre-formed mold and are compressed in their heated state resulting in the pellets combining to form the animal feed block in the shape of the mold. Systems may use a pellet mill and a hydraulic press where conditioning and pellet formation takes place in the pellet mill and formation of the animal feed block is through compressing a collection of heated pellets using the hydraulic press.

18 Claims, 1 Drawing Sheet

(51) Int. Cl.
 *A23K 50/10* (2016.01)
 *A23K 50/70* (2016.01)

(56) References Cited

U.S. PATENT DOCUMENTS

| | | | |
|---|---|---|---|
| 8,287,268 B1 | 10/2012 | Thomas | |
| 9,968,114 B1* | 5/2018 | Burr | A23K 1/003 |
| 2004/0224065 A1 | 11/2004 | Markham et al. | |
| 2005/0163911 A1* | 7/2005 | McGowen | A23K 40/35 |
| | | | 426/630 |
| 2006/0025951 A1 | 2/2006 | Noel | |
| 2010/0151076 A1* | 6/2010 | Liang | A23K 10/30 |
| | | | 426/2 |
| 2012/0148718 A1* | 6/2012 | Wilson | A23K 40/20 |
| | | | 426/335 |
| 2012/0301598 A1 | 11/2012 | Karges et al. | |
| 2013/0199452 A1 | 8/2013 | Gordon et al. | |

FOREIGN PATENT DOCUMENTS

| | | |
|---|---|---|
| WO | 9824330 A1 | 6/1998 |
| WO | 9930570 A1 | 6/1999 |
| WO | 2004030466 A1 | 4/2004 |
| WO | 2014019013 A1 | 2/2014 |

\* cited by examiner

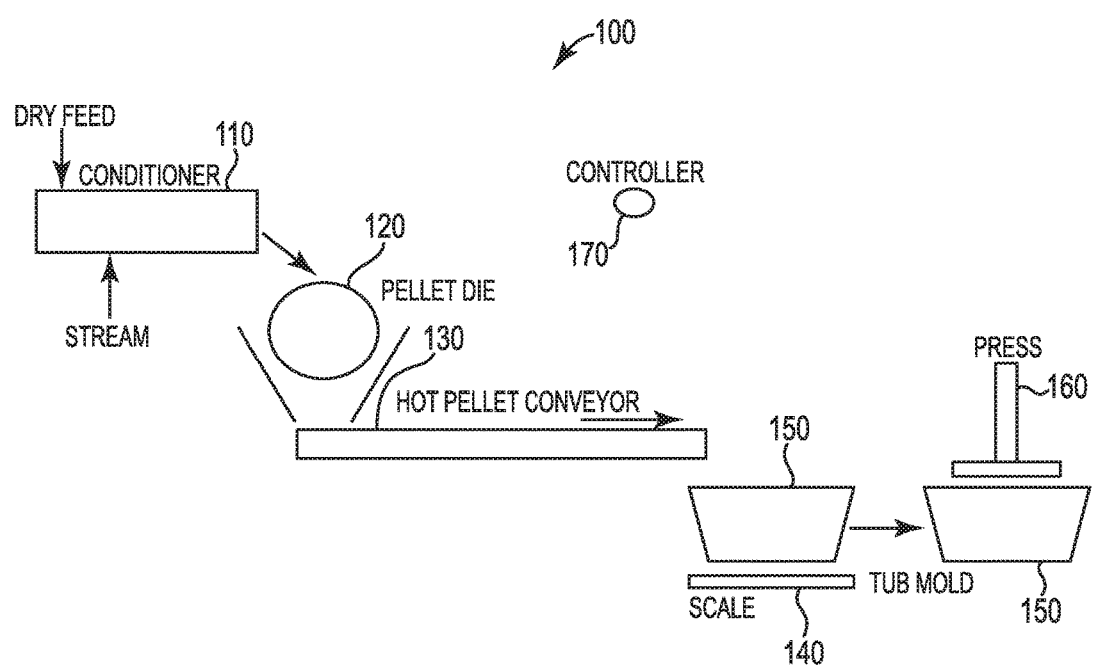

SYSTEM AND METHOD FOR PRODUCING PELLETED ANIMAL FEED BLOCKS

CROSS-REFERENCE TO RELATED APPLICATION(S)

This application is a continuation of U.S. application Ser. No. 14/057,914 filed Oct. 18, 2013, the contents of which are incorporated herein by reference.

FIELD OF THE INVENTION

The present disclosure relates to systems and methods for producing pelleted animal feed blocks, and to pelleted feed blocks formed therefrom.

BACKGROUND

Compressed animal feed blocks are generally made using binding agents such as chemical additives or lignin-based binders to hold the final shape of the product. Compressed blocks are also produced by extruding material into a mold or pressing the extrudate into a mold as a means of setting its shape and hardness. Pellet mills typically produce less gelatinazion of starches and use a combination of mechanical and thermal energy, as opposed to some extruders that use only mechanical energy. Pellet mills typically only compress particles, whereas extruders may compress and expand (e.g., through steam expansion of the particles) the particle. As a result, pellet mills generally soften individual particles and, in contrast, extruders tend to liquefy the dry ingredients due to a combination of high temperature and pressure. However, some binders may not be palatable for the animal consuming the feed block. In addition, binders may add little or no nutritive value to the feed block and may add expense to its production.

SUMMARY

In view of the foregoing, systems and methods for producing pelleted feed blocks are provided in the present disclosure. The feed blocks may be produced using a pellet mill which may condition the feed material and form heated pellets, and the heated pellets may be compressed in a mold, for example, using a hydraulic press. In some implementations, the compressed, pelleted feed blocks are formed without using binder additives.

According to one implementation, a method of preparing a compressed, pelleted animal feed block involves conditioning a meal comprising a particulated animal feed mixture by heating the meal using steam to cause at least one of the feed components in the feed mixture to bind the meal and reach a temperature of about 160° F. The heated meal is mechanically forced through a die to compress the meal into heated pellets having a temperature of at least about 175° F. upon exiting. The heated pellets are collected in a pre-formed mold and are compressed by exerting a pressure of at least about 90 pounds per square inch while the pellets are at a temperature of about 140° F. or higher so that the compressed heated pellets combine to form the animal feed block.

According to another implementation, a system for forming a compressed, pelleted animal feed block uses a pellet mill to condition a meal formed of a particulated animal feed mixture by injecting steam into the meal to cause particulated animal feed components to bind the meal and by mechanically forcing the conditioned meal through a die to compress the meal into pliable, heated pellets. A mold is used to receive the pellets and a hydraulic press compresses the heated pellets in the mold by exerting a pressure of at least 90 pounds per square inch while the pellets are at a temperature of at least about 140° F. such that the compressed heated pellets combine to form the animal feed block. A controller controls operating parameters of the system.

BRIEF DESCRIPTION OF THE DRAWINGS

FIG. 1 illustrates a system diagram that may be used in producing feed blocks according to certain implementations.

DETAILED DESCRIPTION

Methods and systems for providing pelleted animal feed blocks are included in the present disclosure. Pelleted animal feed blocks may be used as feed supplements or as a complete feed for a variety of animals. For example, the feed blocks may be provided as a supplement to horses, ruminants (e.g., heifers, cows, steer, deer, and goats), sheep, pigs, chicken, and the young counterparts to the aforementioned animals. In addition or alternatively, the feed blocks may be provided as a complete feed to chickens, other birds and small mammals such as gerbils and guinea pigs.

Pelleted animal feed blocks may generally be composed of compressed feed pellets formed of meal and may sometimes be referred to as pellet blocks. The meal may be formed of a feed mixture that is ground so that no whole grains are present resulting in a meal with various particle sizes. The meal may be composed of ground wheat middlings, dehulled soybean meal, sunflower meal, cottonseed meal, salt, molasses, and micronutrients (e.g., vitamins and trace minerals) such as calcium carbonate and mono-dicalcium phosphate, urea and combinations thereof. However, other feed mixtures and feed components may be included in the meal used and the aforementioned examples should not be construed as limiting.

Nutritionally, the meal may contain fat in an amount up to 10 percent by weight, preferably from about 3 to about 10 percent by weight, or more preferably from about 3 to about 5 percent by weight of the meal. Protein may be present at about 10 to about 35 percent by weight of the meal, fiber at about 5 to about 15 percent by weight of the meal, and starch at about 5 to about 15 percent by weight of the meal. Moisture in the mixture may be present at about 8 to about 13 percent by weight, and preferably about 8 to about 10 percent by weight of the total weight of the meal.

In some implementations, the meal, feed pellets and the compressed feed block may be free of lignin binders, gums, alginates and other compositions commonly used as binding agents such as calcium oxide or magnesium oxide. More specifically, the meal composition itself, e.g., the protein, starch, fat and/or fiber in the meal may be conditioned so as to bind the composition. Although molasses and other syrup-like components may be included in the compressed feed block, these may serve as a palatant and may be in an insufficient amount to bind the pellets.

Animal feed blocks of the present disclosure are formed generally by producing a heated meal from a particulated feed mixture; forming heated, compressed pellets from the mash; and re-compressing a collection of pellets into a feed block, e.g., a pellet block.

According to certain implementations, the feed blocks may be produced by the system depicted in FIG. 1. As shown in FIG. 1, the system 100 includes a pellet mill with a conditioner 110 and a pellet die 120, a conveyor 130, scale 140, a pre-formed tub mold 150, a press 160 and a controller 170. It will be appreciated that other system components may be included in the system 100 such as a blender for mixing dry feed and heating devices for adding heat to or maintaining the temperature of the heated pellets, and thus the system components depicted in FIG. 1 should not be construed as limiting.

According to certain implementations, the meal is fed into the pellet mill via a feeder, which may control the production rate of the feed blocks. From the feeder, the meal passes into a conditioner 110. In some implementations, the meal containing the particulated feed mixture may be blended prior to introduction into the conditioner 110, for example using a 1-ton industrial batch mixer, in order to uniformly distribute the feed mixture components.

In the conditioner 110, the meal is heated with steam to increase its temperature and add moisture. As heat and moisture are added to the feed mixture, a mash is formed. In particular, steam may be injected into the meal in order to add about 1 percent to about 2 percent by weight moisture to the mixture. At or prior to the conditioner 110, other liquid ingredients may be added, such as molasses and sources of fat. During conditioning, the feed composition, such as one or more of the protein, fat, fiber and starch, may serve to bind the feed components in pellet form. For example, wheat middlings are generally high in starch and during conditioning this starch may gelatinize and bind the feed composition. In another example, cottonseed meal cake includes fiber and protein, and one more of these components may serve to bind the feed components. In particular, cottonseed meal is a binder and may serve to bind the animal feed block. Accordingly, the pellets and the compressed feed block may be free of binders such as lignin binders as the manufacturing process described herein causes one or more of the feed mixture components in the meal to serve as a binder.

Upon exiting the conditioner 110 of the pellet mill, the heated meal is introduced into the pellet mill die 120 where it is compressed through the holes defined by the die. During this compression, the meal is heated further due to friction and the added mechanical energy. For example, a temperature increase associated with mechanical energy and friction in the meal may add about 5 to 25° F. of thermal energy. The conditioned feed mixture exits the die in a ribbon that may be sliced transversely to form pellets. Once the pellets have exited the die 120, they are hot and have a pliable texture and the meal is bound together in a compressed, pellet-form as a result of the conditioning and mechanical force through the die 120. In some implementations, the heated pellets may exit the die at temperatures between 160° F. and 190° F., and preferably between about 170° F. to 180° F., or at least about 170° F.

During pelleting, and as provided above, the fat content in the meal or mash is generally 10 percent by weight or lower, preferably from about 1 to about 10 percent by weight, or more preferably from about 3 to about 5 percent by weight of the mixture. These lower levels of fat enable the die to maintain a level of mechanical energy and friction on the meal that allows it to compress and soften. Otherwise, higher levels of fat during pelleting will reduce the friction mechanical energy preventing the meal from compressing and softening and instead would travel through the die rapidly and with insufficient energy absorbed.

Accordingly, the pellet mill adds heat and moisture from the conditioner 110 to soften and cause binding of the feed material, and using mechanical energy from compression through the die 120, the meal is further heated and softened, thereby providing a pliable pellet. The compositional profile of the feed pellets exiting the die 120 is substantially the same as the composition of the meal entering the pellet mill with the exception that about 1 to 2 percent moisture by weight of the pellet is added. In particular, components such as moisture and fats in the form of oil are not lost during processing in the pellet mill. After movement through the die 120, the hot pellets may be collected at the exit of the pellet mill door.

Although a pellet mill is contemplated as the preferred device for conditioning the mash and forming heated pellets in the present disclosure, other devices adapted to condition the feed mixture are also within the scope of the present disclosure, and conditioning using a pellet mill should not be construed as limiting.

The finished pellets may have a diameter of ⅛" to ¾" or preferably about ¹¹⁄₆₄"; may have a length of from about ¹⁄₁₆ to about 3"; and may be provided in a variety of shapes and sizes, such as in cylindrical or cube shapes. The pellets may weigh from about 0.04 grams to about 40 grams each. For example, ¾" diameter range cubes may weigh 20 to 35 grams each, depending on the length. ¹¹⁄₆₄" pellets may weigh from about 0.25 grams to about 0.35 grams each depending on length. ⅛" pellets weigh from about 0.08 to about 0.10 grams each depending on length. The pellets may contain up to 9 to 14 percent moisture by weight of the pellet, and preferably about 10 to 13 percent moisture by weight, or about 12 percent moisture by weight.

The finished pellets may be placed in a holding vessel or directly into a tub mold 150 in their heated state. For example, a belt conveyor 130 may move the hot pellets to a holding container for subsequent separation in a tub mold 150, or the conveyor may deposit the hot pellets directly into the tub mold 150. Alternatively, the pellets may be manually added to these vessels. The total weight of the pellets added to the tub mold 150 is measured using a scale 140. A metal ring may be placed on the top edge of the mold, for example, to extend the volume of the mold and thus its capacity for holding a desired weight of pellets. In certain implementations, feed components may be combined with the pellets in the tub mold 150 prior to pressing. For example, grains such as cracked grains (e.g., cracked corn) oats and other feed components not having passed through the pellet mill may be added to the collected pellets.

The mold 150 and the optional ring filled with pellets may be placed in a hydraulic press 160 where pressure may be applied from the top of the mold onto the pellets as the pellets are compressed into a mass in the shape of the mold 150. The hydraulic press typically holds the heated pellets under compression at about 90 to about 240 psi and preferably at least at 130 psi for a holding period from about 1 to about 15 minutes depending on the desired final hardness of the pellet block. In particular, a lower holding time will result in a softer pellet block and a longer holding time will produce a harder pellet block due to the sustained pressure facilitates the pellets binding to each other. Accordingly, during the holding period the soft pellets may be compressed together and may combine such that the mass of pellets take the shape of the mold 150. The collection of pellets may be held under pressure for several minutes while combined mass begins to cool and therefore hold the shape of the mold. As the pressure and hold time interval are increased, the product tends to become harder. In some implementations, the compositional profile of the feed blocks produced from the mold 150 is substantially the same as the composition of the heated pellets exiting the pellet mill. In particular, during pressing, moisture is not lost as a result of compressing the heated pellets together in the mold 150 and thus a moisture level of the feed block is substantially the same as a moisture level of the heated pellets.

It has been discovered that the feed pellets in their compressed, heated state are particularly suited for use in forming feed blocks. While feed pellets are typically cooled immediately after exiting a pellet mill, the implementations of the present disclosure use the pellets in their heated state to form feed blocks. Further, the implementations of the present disclosure are in contrast to other approaches that form feed blocks from heated meal. The compressed meal in pellet form and the thermal energy within the pellets facilitates bonding of the feed pellets to form the feed block. Moreover, methods and systems of the present disclosure form the feed blocks in such a way that the composition of the meal is retained through the formation of the heated pellets and the subsequent feed blocks. This is in contrast to approaches where oils or moisture are removed during production. Because pellets are more dense than meal, pellets can be more readily packed into the mold. The additional pressure from the hydraulic press increases the hardness of the pellets in the block beyond the hardness of the pellets alone.

According to certain implementations, from the time the heated pellets exit the die 120 to the time the heated pellets are pressed in the hydraulic press 160, the pellets are not cooled using a cooling device and moisture is not removed from the pellets. Consequently, the temperature of the pellets remains similar to the pellets exiting from the pellet mill die. By maintaining the pellets at elevated temperatures, subsequent pressing in the hydraulic press enables the pellets to combine into a pellet block without the use of additional binders. Preferably, the temperature of the collected pellets in the vessel remains between about 140° F. to about 160° F. until pressing. In some implementations, the heated pellets in the mold 150 or other vessel may be covered to retain heat. In addition or alternatively, the heated pellets may be rapidly moved from the pellet mill to the hydraulic press, such as via a conveyor, or may be exposed to an external heat source so that the temperature of the heated pellets remains at least about 140° F. prior to using the hydraulic press 160.

The production of the compressed, pellet blocks may be controlled using a controller 170 configured to control the operating parameters of the devices of the system 100 such as the pellet mill, the hydraulic press or presses, conveyors, scales and external heat sources, if present. In some implementations, the controller may be configured as a computer, as a control panel or a combination of these.

In some systems, multiple presses may be operating simultaneously because the heated pellet production rate from the pellet mill may exceed the production rate of the pellet blocks using a single press. For example, where the pellets are produced at a rate of about 1.5 tons per hour and thus 50 lbs. of heated pellets can be collected per minute, and where a 10 to 250 pound pellet block is formed after a holding time of about least 5 minutes, multiple presses may be provided so that the heated pellets are not held for a time where pellets cool below 140° F. However, where production rates are slow or where the heated pellets would otherwise cool below desired temperatures, the pellets may be heated using external heat sources in order to maintain the temperature and moisture content of the pellets at a level that is substantially similar to the temperature and moisture content as the pellets directly upon exiting the conditioner.

Examples

It has been discovered that the temperature of the heated pellets at the time of pressing, the hold time during pressing, pressure of the hydraulic press and the formulation of the feed block may all have an effect on the final hardness of the blocks. Accordingly, the following three examples illustrate trials where compressed feed blocks were produced from heated pellets. These examples are provided by way of illustration and should not be construed as limiting, as those skilled in the art will appreciate various modifications of the present examples fall within the spirit and scope of the present disclosure.

Example 1

An investigation was conducted to determine whether heated pellets free of binders and formed from a pellet mill could be compressed into a solid block with an acceptable hardness, such as a block with a hardness of at least 45 psi when tested using a pneumatic tester having a ⅜" diameter pin being driven ½" into the top surface of the block.

Materials and Methods:

The compositions listed in Table 1 below were mixed in a 1-ton batch mixer to form a meal. The blended meal was subjected to conditioning in pellet mill and run across the 11/64" die with a target conditioned meal temperature of 170° F. at a feed rate of 50 pounds per minute, with the pellet mill motor requiring 36 amps. The base meal temperature was 76° F., the conditioned meal temperature was 171° F. and the hot pellet temperature was 190° F. upon exiting the pellet mill.

Pellets were collected as they exited the pellet mill door and placed in a large plastic tub. The filled tub was covered to maintain the temperature of the pellets at approximately 180° F. and the tub was moved to a 50-ton hydraulic press. 55-pounds of the pellets were placed in a smaller tub and placed in the press, and the desired pressure was applied and held for the hold time. The first two tubs were made using the hydraulic press at a maximum pressure of 93 psi, and the press was adjusted to 127 psi for the remaining tubs. It was noted that minimal amounts of product was squeezed out around the edges of the press head and moisture from the mash was retained within the tub.

After 24 hours, the tubs were tested for hardness with the pneumatic block tester using the ⅜" diameter pin and driving it into the top surface of the block to a depth of ½" and recording the amount of air pressure that was required. After hardness testing, one of the blocks was core drilled and the material was tested for its water activity as an indication of potential mold growth.

TABLE 1

| | |
|---|---|
| WHEAT MIDDLINGS | 61.47 |
| DEHULLED SOYMEAL | 9.60 |
| SUNFLOWER ML (DH) | 15.50 |
| CALCIUM CARBONATE | 1.59 |
| MONO-DICAL PHOSPHATE | 0.29 |
| SALT | 0.55 |
| UREA | 3.50 |
| VEGETABLE FAT | 2.50 |
| MOLASSES | 5.0 |
| SUB-TOTAL | 100.000 |

Results and Summary:

TABLE 2

Pelleted Feed Tub Hardness Results

| Press Pressure | Hold Time | Hardness (psi) |
|---|---|---|
| 91 psi | 5 minutes | 46 |
| 91 psi | 5 minutes | 53.5 |
| 127 psi | 5 minutes | 70 |
| 127 psi | 7.5 minutes | 67 |
| 127 psi | 10 minutes | 52 |

From the hardness data of Table 2, it appeared counter-intuitive that the hardness of the 127 psi pressure treatments was actually reduced as the hold time increased. However, the pellets were collected in one large tub and then divided into 55-pound portions in a smaller tub, in sequence, for pressing. This meant the first block pressed at a 5-minute hold time had the hottest temperature compared to the 7.5- and 10-minute hold times. The lag time between pellet formation and pressing allowed the pellets to cool and start to harden prior to being pressed. For example, while the hot pellet temperature was 190° F. upon exiting the pellet mill, after 15 minutes in ambient temperatures, the hot pellets cooled to 140° F. This would seem to indicate that minimal hold time between the pellet mill and the press is desired.

In general, the increased pressure from 91 to 127 psi increased the final hardness of the blocks and higher press pressures should result in even harder blocks.

A concern with this process is also that there may be mold growth since the moisture added at the conditioner prior to the pellet mill was not removed by a cooler. Water activity of the finished tub was measured at 0.71. This water activity level may be reduced by providing a lower moisture steam to condition the meal and by adding salts to the base formula. In further implementations, salt, antimicrobials (e.g., 0.5 percent by weight propionic acid) or both may be added to the pellet formula to reduce water activity below a level that sustains mold growth.

Example 2

In this example, further investigation of compressing heated pellets free of binders into a tub involved studying the effect of fat on the final hardness and the feasibility of producing feed tubs formed primarily of cottonseed meal.

Materials and Methods:

The compositions listed in Table 3 below were mixed in a 1-ton batch mixer to form a meal of particulated feed. The blended meal was subjected to conditioning in pellet mill and run across the 11/64" die with a target conditioned meal temperature of 180° F. to 185° F. at a feed rate of 100 pounds per minute. These conditions were held constant for the first three formulas. As the fat content increased in the first three compositions, the level electricity required to run the pellet mill decreased from 45 amps at 5 percent by weight fat to 32 amps at 9 percent by weight fat. For the two cottonseed meal treatments, the 11/64 pellet was run at 180° F. and the pellet mill required 70 to 80 amps. When this same formula was run on the 3/4" cube die, the conditioned meal temperature was only able to get to 160° F. and pulled between 50 and 60 amps.

Pellets were collected as they exited the pellet mill door and placed in a large plastic tub. The filled tub was covered in order to maintain the temperature of the pellets at approximately 180° F. and the tub was moved to a 50-ton hydraulic press. 55-pounds of the pellets were added to a smaller tub, the tub was placed in the press and the desired pressure was applied and held for the hold time. The tubs were pressed with 127 psi and held for 8 minutes. It was noted that minimal amounts of product were squeezed out around the edges of the press head and moisture from the mash was retained within the tub.

TABLE 3

| MAIN FORMULA | RATION 1 5% FAT | RATION 2 7% FAT | RATION 3 9% FAT | RATION 4 COTTON CAKE |
|---|---|---|---|---|
| CALCIUM CHLORIDE | | | | 1.00 |
| WHEAT MIDDLINGS | 62.03 | 60.03 | 58.03 | |
| COTTONSEED MEAL | | | | 89.50 |
| DEHULLED SOYMEAL | 9.60 | 9.60 | 9.60 | |
| SUNFLOWER ML (DH) | 15.50 | 15.50 | 15.50 | |
| CALCIUM CARBONATE | 1.58 | 1.58 | 1.58 | |
| MONO-DICAL PHOSPHATE | 0.29 | 0.29 | 0.29 | |
| SALT | 1.00 | 1.00 | 1.00 | |
| UREA | 3.50 | 3.50 | 3.50 | |
| VEGETABLE FAT | 2.5 | 4.50 | 6.50 | 3.00 |
| MOLASSES | 4.00 | 4.00 | 4.00 | 3.00 |
| CALCIUM CHLORIDE | | | | 3.50 |
| SUB-TOTAL | 100.000 | 100.000 | 100.000 | 100.000 |

After 24 hours, the tubs were tested for hardness with a pneumatic block tester using a 3/16" diameter pin. Testing involved using air pressure to drive the pin into the top surface of the block to a depth of 1/2" and the amount of air pressure required was recorded.

Results and Summary:

The hardness results using the pneumatic tester are provided in Table 4 below.

TABLE 4

| Product | Tub 1 Pressure (psi) | Tub 2 Pressure (psi) |
|---|---|---|
| Ration 1 - 5% Fat 11/64" Pellet | 38 | 32.6 |
| Ration 2 - 7% Fat 11/64" Pellet | 30.6 | 28.3 |
| Ration 3 - 9% Fat 11/64" Pellet | 23 | 26.3 |
| Ration 4 - CSM 11/64" Pellet | 56 | 52 |
| Ration 4 - CSM 3/4"cube | 72.3 | 58.6/58.6 |

As the level of fat in the mash and resulting feed block increased in the formula, the hardness tended to decrease as expected. The cottonseed meal treatments were made with a common formula as provided in Table 4. The larger size of the cube (3/4") being pressed into the tubs tended to make a harder product than when a smaller pellet (11/64") was used. The larger cubes may have retained heat from conditioning better providing more pliability when pressed, and may have resulted in a harder finished product. In addition, calcium chloride was added to the cottonseed meal formula and likely had a positive effect on the hardness of the finished product.

Example 3

This study looked at three aspects of the processes for producing compressed, pelleted feed blocks: 1) the effect of adding a lignin binder to the base formula; 2) adding grains to the hot pellets prior to pressing; and 3) looking at the effect of the pelleting compared to only steam conditioning the base formula.

Materials and Methods:

The compositions listed in Table 5 were mixed in a 1-ton batch mixer, and the meal was delivered to a pellet mill and run across a 11/64" die with a target conditioned meal temperature of 160° F. and a feed rate of 80 pounds/minute. Pellets were collected upon exiting the pellet mill door and placed in a plastic tub. A cardboard cover was placed on top of the pellets to try and retain their temperature. The plastic tubs were then moved to the first floor where the press was located.

For the tubs that had the cracked corn and oats added, the pellets were weighed out to the correct amount, then the pre-weighed corn and oats were added. The pellets and grains were then blended by hand in the tub.

Each tub was placed in a 50-ton press and the desired pressure was applied and held for the hold time. The pellets or mash were then subjected to 127 psi using the hydraulic press for hold times of either 5 or 10 minutes. It was again noted that minimal amounts of product was squeezed out around the edges of the press head.

After 4 days, the tubs were tested for hardness with the pneumatic block tester using the 3/16" diameter pin and driving it into the top surface of the block to a depth of ½" and recording the amount of air pressure that was required.

The pellet mill operating amperage, mixed meal temperature, conditioned meal temperature, hot pellet temperature and hardness values are provided in Table 6.

TABLE 5

|  | Control | Binder |
|---|---|---|
| ALFALFA LEAF MEAL | 4.00 | 4.00 |
| WHEAT MIDDLINGS | 13.01 | 12.01 |
| DEHULLED SOYMEAL | 61.61 | 61.61 |
| LIGNIN BINDER | 0.00 | 1.00 |
| CALCIUM CARBONATE | 6.14 | 6.14 |
| MONO-DICAL PHOSPHATE | 4.96 | 4.96 |
| SALT | 1.00 | 1.00 |
| MOLASSES | 4.00 | 4.00 |
| SOY OIL-CRUDE | 4.00 | 4.00 |
| MAGNESIUM OXIDE 51 | 1.28 | 1.28 |
| SUB-TOTAL | 100.00 | 100.00 |

TABLE 6

| Run No. | Variable | Pellet Mill Amps | Mixed Meal Temp ° F. | Cond. Meal Temp ° F. | Hot Pellet Temp. ° F | Hardness psi |
|---|---|---|---|---|---|---|
| 1 | Control-Pellet-5 minute | 38 | 84 | 161 | 170 | 71 |
| 2 | Control-Meal-5 minute | 31 | 84 | 162 | 160 | 66 |
| 3 | Control-Pellet-10 minute | 37 | 84 | 162 | 172 | 82 |
| 4 | Control-meal-10 minute | 30 | 84 | 161 | 157 | 73 |
| 5 | Control-Pellet + corn and Oats-5 minute | 35 | 84 | 162 | 175 | 37 |
| 6 | Control-Pellet + corn and Oats-5 minute | 36 | 84 | 161 | 173 | 43 |
| 7 | Lignin-Pellet-5 minute | 36 | 84 | 161 | 172 | 83 |
| 8 | Lignin-Meal-5 minute | 30 | 84 | 161 | 153 | 68 |
| 9 | Lignin-Pellet-10 minute | 35 | 84 | 161 | 176 | 88 |
| 10 | Lignin-Meal-10 minute | 30 | 84 | 160 | 151 | 77 |
| 11 | Lignin-Pellet + Corn and Oats-10 minute* | n/a | n/a | n/a | n/a | 76 |
| 12 | Lignin-Pellet + Corn and Oats-10 minute* | n/a | n/a | n/a | n/a | 48 |

*Operating conditions were not recorded

Results and Summary:

The first comparison between runs 1-6 and 7-12 studied whether adding a lignin binder would increase the hardness of the final tubs. When looking at treatments with similar hold times, the addition of the lignin binder did slightly increase the hardness of the products in each comparison. For example, the pellets that were held for 5 minutes increased from a hardness of 71 to 83 with the addition of the lignin. Also, with the meal held for 10 minutes, the hardness increased from 73 to 77 with the addition of the lignin binder to the formula. However, the hardness of the control pellet in runs 1-6 were sufficiently hard for purposes of transport and limiting ingestion by the animal.

The second comparison between pelleted and meal runs either held for 5 or 10 minutes, e.g., comparisons between runs 1 and 2, 3 and 4, 7 and 8 and 9 and 10, studied whether the hardness of the pellet block increased when the product was run across the pellet die in addition to being steam heated in the conditioner compared to only being run through the conditioning chamber and by-passing the pellet die. In all comparisons processing the meal across the pellet die increased the hardness of the final product. For example, the control meal pressed for 5 minutes increased from 66 to 71 when it was pelleted. Also, in the lignin 10 minute hold time variables, the hardness increased from 77 to 88 when the product was processed across the die.

The final comparison investigated whether the addition of cracked corn and whole oats in runs 5, 6, 11 and 12 was feasible in this manufacturing method. In both products that were produced, i.e., the control and lignin formulas, the addition of the cracked corn and oats made an acceptable looking product with good distribution even though the hardness of the product was reduced. The reduction in hardness may have resulted from three different sources of variation. First, when the corn and oats were mixed with the hot pellets, the time between collecting the pellets and pressing the tub increased. In Example 1, it was noted that this lag time tended to reduce the hardness of the tubs. The second source was likely the addition of the corn and oats, which were at ambient temperatures at the time of addition. As a result, this likely reduced the overall temperature of the product, i.e., by dilution. Lastly, the corn and oat particles may have reduced the total amount of binding area within the finished tub and thus reduced the final hardness.

For the control treatment where the cracked corn and whole oats were added, i.e., in runs 5 and 6, the hot pellets made up 70 percent by weight of the composition, the cracked corn made up 20 percent by weight, and the whole oats were included at 10 percent by weight. These tubs were offered to horses where the pellet blocks were readily consumed. It was noted that the horses could scrape the product with their teeth and separate the pellets out an then consume them.

For lignin treatments where the cracked corn and whole oats were added, i.e., in runs 11 and 12, the hot pellet made up 85 percent by weight of the ration, the cracked corn was 10 percent by weight, and the whole oats 5 percent by weight. These tubs were sent offered to ruminants and were readily consumed.

The compositions, apparatuses and functions of the various implementations may be used interchangeably to form alternative implementations, as would be appreciated by those skilled in the art. Although the present disclosure provides references to preferred embodiments, persons skilled in the art will recognize that changes may be made in form and detail without departing from the spirit and scope of the invention.

What is claimed is:

1. A method of preparing a pelleted animal feed block, the method comprising:
    conditioning a meal comprising animal feed components by heating the meal using steam to cause at least one of the feed components to bind the meal;
    mechanically forcing the heated meal through a die to compress the conditioned meal into heated pellets;
    collecting the heated pellets in a mold; and
    compressing the heated pellets in the mold at a temperature of about 140° F. or higher such that the compressed heated pellets combine to form the pelleted animal feed block comprised of compressed pellets having a hardness that is greater than a hardness of uncompressed pellets after cooling,
    wherein the temperature of the pellets is maintained at about 140° F. or higher upon exiting the die until compressing.

2. The method of claim 1, further comprising subjecting the heated pellets to a heat retention method after exiting the die until collecting the heated pellets in the mold.

3. The method of claim 2, wherein the heat retention method is selected from the group consisting of covering the pellets, rapidly moving the pellets from the die to the mold, and exposing the pellets to an external heat source.

4. The method of claim 1, wherein the animal feed components comprise wheat middlings, dehulled soybean meal, sunflower meal, cottonseed meal, salt, molasses, and micronutrients.

5. The method of claim 1, wherein the meal further comprises an antimicrobial.

6. The method of claim 1, wherein the meal comprises about 3 to about 10 wt % fat.

7. The method of claim 1, wherein the meal comprises about 10 to about 35 wt % protein.

8. The method of claim 1, wherein the pellets are free of binding agents selected from the group consisting of lignin binders, gums and alginates.

9. The method of claim 1, wherein the steam is injected steam and adds about 1 to about 2 percent moisture by weight of the meal.

10. The method of claim 1, wherein the pellets each have a diameter of about 1/8" to about 3/4" and a length of about 1/16" to about 3".

11. The method of claim 1, wherein the pellets each weigh about 0.04 to about 40 grams.

12. The method of claim 1, wherein the pellets comprise about 9 to about 14 wt % moisture.

13. The method of claim 1, wherein compressing the heated pellets comprises applying a pressure of about 90 to about 240 psi for a holding period of about 1 to about 15 minutes.

14. The method of claim 1, wherein compressing the heated pellets comprises applying a pressure of about 127 psi for about 5 to about 10 minutes.

15. The method of claim 1, wherein compressing the heated pellets comprises applying a pressure of about 91 psi for about 5 minutes.

16. The method of claim 1, wherein the pellets comprise about 4 to about 5 wt % molasses and about 2.50 to about 6.50 wt % vegetable fat.

17. The method of claim 1, wherein the pelleted animal feed block weighs about 55 pounds.

18. The method of claim 1, further comprising admixing cracked corn and oats to the mold containing the heated pellets, prior to compressing the heated pellets.

* * * * *